United States Patent
Brown et al.

(10) Patent No.: US 12,500,889 B2
(45) Date of Patent: Dec. 16, 2025

(54) SECURE RESOURCE ACCESS MANAGEMENT USING STACKED RESOURCE PRINCIPAL IDENTITIES

(71) Applicant: Oracle International Corporation, Redwood Shores, CA (US)

(72) Inventors: Jeremy Allen Brown, Seattle, WA (US); Jason Anthony Slepicka, Long Beach, CA (US); Ayman Mohammed Aly Hassan Elmenshawy, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 65 days.

(21) Appl. No.: 18/584,951

(22) Filed: Feb. 22, 2024

(65) Prior Publication Data

US 2025/0097223 A1    Mar. 20, 2025

Related U.S. Application Data

(60) Provisional application No. 63/538,675, filed on Sep. 15, 2023.

(51) Int. Cl.
*H04L 9/40* (2022.01)

(52) U.S. Cl.
CPC ............................. *H04L 63/0876* (2013.01)

(58) Field of Classification Search
None
See application file for complete search history.

(56) References Cited

U.S. PATENT DOCUMENTS

| | | | |
|---|---|---|---|
| 8,418,238 B2* | 4/2013 | Platt | H04L 63/20 726/8 |
| 9,886,309 B2* | 2/2018 | Alles | H04L 67/303 |

(Continued)

FOREIGN PATENT DOCUMENTS

WO    2023055734 A1    4/2023

OTHER PUBLICATIONS

"Oracle Cloud infrastructure Infrastructure Documentation", Available online at : https://web.archive.org/web/20230320184207/https://docs.oracle.com/en-us/iaas/Content/Functions/Tasks/functionsaccessingociresources.html, Mar. 20, 2023, pp. 1-5.

(Continued)

*Primary Examiner* — Backhean Tiv
(74) *Attorney, Agent, or Firm* — Kilpatrick Townsend & Stockton LLP

(57) ABSTRACT

A system is disclosed that provides the ability for a resource residing in one tenancy of a cloud service provider infrastructure (CSPI) to use the identity of a higher-level resource upon which the resource is built to access other resources residing in another tenancy of the CSPI. The system obtains a first identity associated with the first resource that is provisioned in a first tenancy of the CSPI and obtains a first token for the first resource. The system executes instructions to obtain a second identity associated with a second resource upon which the first resource is built. The second resource resides in a second tenancy of the CSPI. The system obtains a second identity associated with the second resource and obtains a second token for the first resource. The first resource uses the second token to access resources that reside in the second tenancy of the CSPI.

20 Claims, 10 Drawing Sheets

(56) References Cited

U.S. PATENT DOCUMENTS

| | | | | |
|---|---|---|---|---|
| 11,223,480 | B2* | 1/2022 | Hecht | H04L 63/20 |
| 11,695,765 | B2* | 7/2023 | Pieczul | H04L 63/101 |
| | | | | 726/4 |
| 11,811,679 | B2* | 11/2023 | Elmenshawy | G06F 9/5077 |
| 11,856,055 | B2* | 12/2023 | Shah | H04L 12/66 |
| 12,137,145 | B1* | 11/2024 | Bhuiyan | H04L 67/141 |
| 12,301,556 | B2* | 5/2025 | Nagaraja | G06F 9/45558 |
| 12,306,921 | B2* | 5/2025 | Mohan | G06F 21/33 |
| 12,316,762 | B2* | 5/2025 | Wilson | H04L 9/0861 |
| 2019/0207772 | A1* | 7/2019 | Hecht | H04L 63/10 |
| 2020/0007541 | A1* | 1/2020 | Appiah | H04L 61/3015 |
| 2021/0409218 | A1* | 12/2021 | Elmenshawy | H04L 9/16 |
| 2021/0409219 | A1* | 12/2021 | Elmenshawy | H04L 9/3228 |
| 2021/0409345 | A1* | 12/2021 | Elmenshawy | G06F 21/44 |
| 2023/0109109 | A1* | 4/2023 | Wilson | H04L 9/0861 |
| | | | | 713/168 |
| 2023/0113325 | A1* | 4/2023 | Nagaraja | H04L 63/0807 |
| | | | | 726/8 |
| 2023/0247087 | A1* | 8/2023 | Nagaraja | H04L 67/10 |
| | | | | 709/201 |
| 2025/0030549 | A1* | 1/2025 | Lindholm | H04L 63/0807 |
| 2025/0030676 | A1* | 1/2025 | Uzun | H04L 63/0823 |
| 2025/0086001 | A1* | 3/2025 | Evani | H04L 63/0815 |
| 2025/0097223 | A1* | 3/2025 | Brown | H04L 63/0815 |

OTHER PUBLICATIONS

Hardjono, "User-Managed Access (UMA) Core Protocol", Draft-Hardjono-Oauth-Umacore- 05.txt, Oct. 1, 2012, pp. 1-51.

International Application No. PCT/US2024/018625, International Search Report and Written Opinion mailed on May 31, 2024, 15 pages.

U.S. Appl. No. 18/373,707, Application filed Sep. 27, 2023, 67 pages.

\* cited by examiner

SECURE RESOURCE ACCESS MANAGEMENT USING STACKED RESOURCE PRINCIPAL IDENTITIES

CROSS-REFERENCES TO RELATED APPLICATIONS

The present application is a non-provisional application of and claims the benefit and priority under 35 U.S.C. 119(e) of U.S. Provisional Application No. 63/538,675, filed Sep. 15, 2023, entitled "Stacked Resource Principal using Nested Resource Principals," the entire contents of which are incorporated herein by reference for all purposes.

BACKGROUND

The demand for cloud-based services continues to increase rapidly. The term cloud service is generally used to refer to a service that is made available to users or customers on demand (e.g., via a subscription model) using systems and infrastructure (cloud infrastructure) provided by a cloud services provider. Typically, the servers and systems that make up the cloud service provider's infrastructure are separate from the customer's own on-premise servers and systems. Customers can thus avail themselves of cloud services provided by a cloud service provider without having to purchase separate hardware and software resources for the services. There are various different types of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

To take advantage of the numerous benefits provided by cloud services, in some cases, resources provisioned in one tenancy (e.g., a service tenancy) of the CSP may require access to resources that are provisioned in a different tenancy (e.g., another service tenancy or a customer tenancy) of the CSP. A service tenancy is a tenancy associated with the CSPI that provides a secure and isolated partition or provisioning platform for provisioning, configuring, and managing the lifecycle of cloud resources associated with services provided by the CSPI. To access and share resources, the administrators of both tenancies need to typically create special policy statements that explicitly state the resources that can be accessed and shared. In some situations, to enable resources to be accessed and shared across tenancies, the internal details (e.g., the resource identities) of the resources need to be exposed to the administrators of the different tenancies. Additionally, writing complex cross-tenancy policies can be cumbersome and can compromise the security of cloud-based services.

BRIEF SUMMARY

The present disclosure relates generally to the secure access of cloud-based resources. More specifically, but not by way of limitation, the present disclosure describes a system that includes capabilities for enabling a resource residing in a first tenancy of a cloud service provider to access resources residing in a different tenancy of the cloud service provider without using a cross-tenancy policy.

In certain embodiments, system is disclosed that provides the ability for a resource residing in one tenancy of a cloud service provider infrastructure (CSPI) to obtain the resource principal identity of a higher-level resource upon which the resource is built and use the resource principal identity of the higher-level resource to access other resources residing in another tenancy of the CSPI. The system obtains a first identity associated with the first resource that is provisioned in a first tenancy of the CSPI. In certain examples, the first identity for the first resource is obtained from a control plane that is responsible for creating the first resource in the first tenancy of the CSPI. The first identity represents a resource principal identity associated with the first resource that enables the first resource to be authorized to access a plurality of cloud resources provided by the CSPI.

The system then obtains a first token for the first resource. The first token enables the first resource to assert its first identity. The first token represents a resource principal session token associated with the first resource that represents a temporary session token and a secure credential associated with the first resource that enables the first resource to authenticate itself to a plurality of cloud resources provided by the CSPI.

The system then executes a set of instructions to obtain a second identity associated with a second resource upon which the first resource is built. The set of instructions comprise code that is executed by an application associated with first resource that informs the first resource to call a control plane of the second resource to obtain the second identity of the second resource.

In certain examples, the second resource resides in a second tenancy of the CSPI. The system obtains the second identity associated with the second resource by validating stack mapping information that identifies a mapping between a resource identifier of the second resource and a resource identifier of the first resource. The second identity represents a resource principal identity associated with the second resource that enables the second resource to be authorized to access a plurality of cloud resources provided by the CSPI.

The system then obtains a second token for the first resource where the second token enables the first resource to assert its second identity. The second token represents a resource principal session token associated with the second resource that represents a temporary session token and a secure credential associated with the second resource that enables the second resource to authenticate itself to a plurality of cloud resources provided by the CSPI.

The first resource then uses the second token to access one or more other resources that reside in a second tenancy of the CSPI without making a cross-tenancy policy call. In certain examples, the first tenancy represents a service tenancy of the CSPI for provisioning, configuring, and managing a set of cloud resources associated with cloud services provided by the CSPI. In certain examples, the second tenancy represents a customer tenancy of the CSPI that represents an account created for a customer of the CSPI that subscribes to one or more services provided by the CSPI.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided therein.

DETAILED DESCRIPTION

Figure 1:
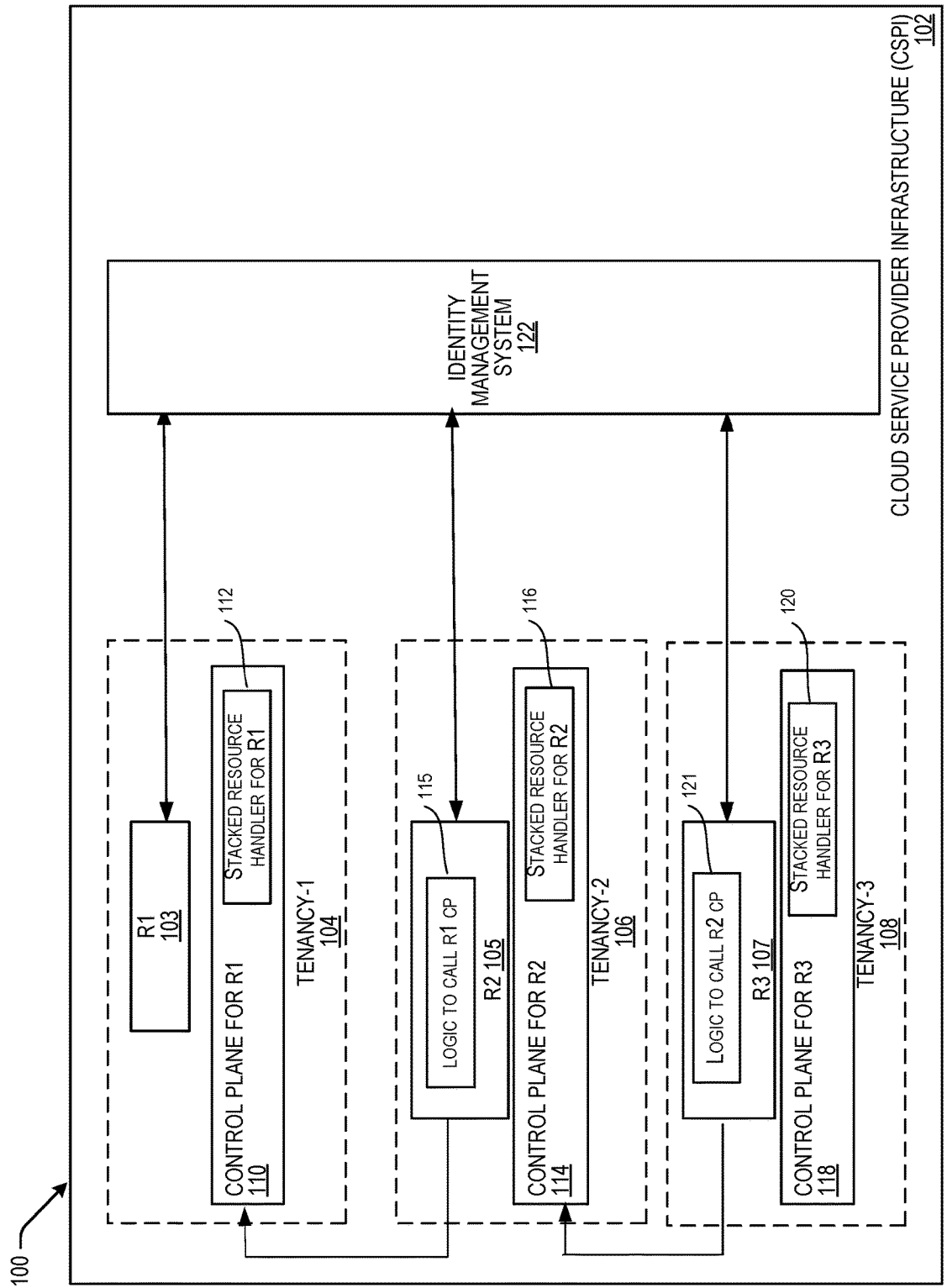
FIG. 1 depicts a simplified diagram of a computing environment in a cloud service provider infrastructure (CSPI) that includes capabilities for enabling a resource residing in one tenancy of the CSPI to access another resource residing in another tenancy of the CSPI without making a cross-tenancy policy call, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to the secure access of cloud-based resources. More specifically, but not by way of limitation, the present disclosure describes a system that includes capabilities for enabling a resource residing in a first tenancy of a cloud service provider to access resources residing in a different tenancy of the cloud service provider without using a cross-tenancy policy.

As previously described, to successfully write a cross-policy statement that enables resources to be shared across different tenancies, the internal details (e.g., the resource identities) of the resources need to be exposed to the administrators of both tenancies. Existing approaches for enabling a resource residing in a first tenancy (e.g., a service tenancy) of a CSP to access to a resource residing in a different tenancy (e.g., a customer tenancy) of the CSP involves writing a cross-tenancy policy statement to enable the resource to successfully make a cross-tenancy call to resources residing in a different tenancy. This typically involves the resource principal identities of the resources to be made available to the administrators of both tenancies so that a cross-tenancy policy can be written that provides permission for a resource residing in one tenancy to access resources that reside in another tenancy. Exposing the resource principal identities of resources is not ideal and can potentially compromise the security of cloud resources.

A service tenancy and a customer tenancy as described herein correspond to secure and isolated partitions of a cloud infrastructure provided by a CSPI (cloud service provider infrastructure) to create, organize and administer cloud resources. For example, a customer tenancy may refer to an account created for a customer of the CSPI. The customer can be any entity such as an individual, an organization, an enterprise, and the like. When a customer subscribes to, or registers for a service provided by the CSPI, a tenancy or an account is created for that customer and this tenancy or account is referred to as the customer tenancy. Different customer tenancies may be created for different customers of the CSPI. A customer can then, via the customer's tenancy, access the subscribed-to one or more cloud resources associated with the account for that customer. In certain examples, a customer tenancy is associated with a compartment. A compartment refers to a logical container for organizing and controlling access to cloud resources (E.g., Compute, Storage, Network, Load Balancer, etc) created within that compartment.

A service tenancy (also referred to as a cloud provider tenancy) is a tenancy associated with the CSPI that provides a secure and isolated partition or provisioning platform for provisioning, configuring, and managing the lifecycle of cloud resources associated with services provided by the CSPI. In certain implementations, different service tenancies may be provided for different cloud services provided by the CSPI. For example, a first service tenancy may be provided for a first cloud service provided by the CSPI (e.g., Fusion Application (FA) cloud service), a second service tenancy may be provided for a second cloud service provided by the CSPI (e.g., Data Science Service for training and provisioning Machine Learning (ML) models), a third service tenancy may be provided for a third cloud service provided by the CSPI, and so on.

The various embodiments described in the present disclosure address the deficiencies of existing approaches for providing secure resource access by disclosing a system that includes capabilities by which a resource residing in one tenancy of the CSPI can access resources residing in another tenancy of the CSPI without the use of a cross-tenancy policy call. The disclosed system provides the ability for a resource residing in one tenancy of the CSPI to obtain the resource principal identity of a higher-level resource upon which the resource is built and use the resource principal identity of the higher-level resource to access other resources residing in another tenancy of the CSPI. A resource principal identity, also referred to throughout this disclosure as a resource principal token (RPT) is a secure identity provided to a cloud infrastructure resource that enables a resource to be authorized to access other cloud infrastructure resources. In certain examples, the resource principal identity is a token signed by an authoritative service in the CSPI that is responsible for managing the resource and which provides trusted metadata about the resource.

By obtaining the resource principal identity of a higher-level resource upon which a resource is built, the resource residing in a particular tenancy of the CSPI is provided with the same permissions as its higher-level resource. Using the resource principal identity of its higher-level resource, the resource can access other resources that reside in another tenancy of the CSPI without making a separate cross-tenancy policy call that provides permission to the resource to access the other resources that reside in the other tenancy. Using the capabilities provided by the disclosed system, an administrator of a tenancy in a CSPI does not have to write separate policies directed to various sub-resources that are composed within a resource where the details (e.g., resource principal identities) of the sub-resources can be potentially exposed to the administrators of various tenancies within the CSPI.

Referring now to the drawings, FIG. 1 depicts a simplified diagram of a computing environment in a cloud service provider infrastructure (CSPI) that includes capabilities for enabling a resource residing in one tenancy of the CSPI to access another resource residing in another tenancy of the CSPI without making a cross-tenancy policy call, according to certain embodiments. As previously described, a tenancy in the CSPI 102 refers to a secure and isolated partition of a cloud infrastructure provided by the CSPI to create, organize, and administer cloud resources. A tenancy may represent a customer tenancy, or a service tenancy associated with the CSPI. A customer tenancy in the CSPI may refer to an account created for a customer of the CSPI. The customer can be any entity such as an individual, an organization, an enterprise, and the like. When a customer subscribes to, or registers for a service provided by the CSPI, a tenancy or an account is created for that customer and this tenancy or account is referred to as the customer tenancy. Different customer tenancies may be created for different customers of the CSPI. A customer can then, via the customer's tenancy, access the subscribed-to one or more cloud resources associated with the account for that customer. In certain examples, the customer tenancy is associated with a compartment. A compartment refers to a logical container for organizing and controlling access to cloud resources (E.g., Compute, Storage, Network, Load Balancer, etc.) created within that compartment.

A service tenancy (also referred to as a cloud provider tenancy) is a tenancy associated with the CSPI that provides a secure and isolated partition or provisioning platform for provisioning, configuring, and managing the lifecycle of cloud resources associated with services provided by the CSPI. In certain implementations, different service tenancies may be provided for different cloud services provided by the CSPI. For example, a first service tenancy may be provided for a first cloud service provided by the CSPI (e.g., Fusion Application (FA) cloud service), a second service tenancy may be provided for a second cloud service provided by the CSPI (e.g., Data Science Service for training and provisioning Machine Learning (ML) models), a third service tenancy may be provided for a third cloud service provided by the CSPI, and so on.

For example, for a Fusion Application (FA) cloud service, a service tenancy provided for this service may include capabilities for provisioning a FA resource in the CSPI. The FA resource may represent a type of cloud resource that is provided by the CSPI for enterprise resource planning purposes. The provisioning of the FA resource may involve the provisioning of multiple lower-level infrastructure resources that are composed within the FA resource such as databases, buckets, and object stores. In certain implementations, the FA resource may be created (provisioned) in one tenancy (e.g., a customer tenancy or a service tenancy) of the CSPI while the lower-level infrastructure resources (also referred to herein as sub-resources) that are part of the higher-level FA resource are provisioned by services in other service tenancies of the CSPI that are responsible for managing those resources.

As another example, for a Machine Learning (ML) cloud service, a service tenancy provided for this service may include capabilities for provisioning a ML resource in the CSPI for building, training, deploying, and managing a machine learning model. The ML resource may be composed of a set of one or more building blocks comprising data storage resources (e.g., object storage buckets), execution resources and resources for serving model predictions. The execution resources may comprise, for instance, Job Run resources and Pipeline Run resources. The Job Run resource enables the execution of repeatable machine learning tasks for the ML resource. The Job Run resource can automatically provision compute resources (such as CPU or GPU) based on the block volume, shape, and network configuration of the job required for model building. The Pipeline Run resource enables the execution of end-to-end machine learning workflows for the ML resource and defines a workflow of tasks or steps for data import, data transformation, model training, and model evaluation. Such an ML resource may be provisioned, for instance, in a one tenancy (for e.g., a customer tenancy or a service tenancy) of the CSPI while the execution resources may be provisioned by managed infrastructure (i.e., another service tenancy or a provisioning platform) provided by a service in the CSPI.

The embodiment depicted in FIG. 1 illustrates a set of tenancies (tenancy-1 104, tenancy-2 106 and tenancy-3 108) associated with the CSPI 102 for provisioning one or more cloud resources (R1 103, R2 105, R3 107) for one or more services provided by the CSPI. In a certain implementation, tenancy-1 may correspond to a customer tenancy of the CSPI while tenancy-2 and tenancy-3 may represent different service tenancies of the CSPI. In other implementations, tenancy-1, tenancy-2 and tenancy-3 may all represent different service tenancies of the CSPI. In certain implementations, the resources R1, R2, and R3 may be hierarchically related to one another, where R2 is a child resource of its parent resource R1 and R3 is a child resource of its parent resource R2. Each tenancy within the CSPI 102 may be associated with a control plane that includes capabilities for creating and managing a set of one or more resources within its tenancy. For example, in the embodiment depicted in FIG. 1, a control plane (CP) 110 may include capabilities for creating and managing a resource R1 103 in tenancy-1 104 of the CSPI 102. Similarly, a control plane (CP) 114 may include capabilities for creating and managing a resource R2 105 in tenancy-1 106 and a control plane (CP) 118 may include capabilities for creating and managing a resource R3 107 created in tenancy-1 108.

In certain embodiments, a control plane within a tenancy may implement a stacked resource handler. The stacked resource handler is associated with a resource that is created in a particular tenancy and includes capabilities for identifying one or more additional resources (e.g., sub resources) that are involved in the creation of the resource in the tenancy. In a certain implementation, the stacked resource handler identifies one or more additional resources that are involved in the creation (provisioning) of a resource and creates a resource stack for the resource. The resource stack comprises a set of resources, where the additional resources (sub-resources) that are involved in the creation of a resource are placed at the bottom of the stack and the resource (i.e., the top level resource) that is created in the tenancy is placed at the top of the stack.

For instance, in the example of a resource R1 that is composed of multiple lower-level resources (sub-resources, R2 and R3) where R2 is a child resource of R1 and R3 is a child resource of R2, the stacked resource handler 112 for R1 is responsible for identifying that sub-resource R2 is involved in the provisioning of resource R1 in tenancy-1 104, the stacked resource handler 116 for R2 is responsible for identifying that the sub-resource R3 is involved in the provisioning of sub-resource R2 in tenancy-2 106 and the stacked resource handler 120 for R3 is responsible for identifying one or more sub-resources (if any) that are involved in the provisioning of resource R3 in tenancy 3 108. The stacked resource handler for a resource additionally creates and stores stack mapping information that identifies a directional mapping between a resource identifier of a resource that is placed at the top of the stack and a resource identifier of a sub-resource composed within the top level resource that is placed at the bottom of the stack. A stacked resource handler for a resource may be implemented using software (e.g., code, instructions, program) executed by the control plane.

The stacked resource handler for a resource in a control plane associated with a tenancy additionally includes capabilities to validate a resource access request from a resource that is provisioned in its tenancy. For instance, a sub-resource (e.g., R3) provisioned in a tenancy-3 108 of the CSPI may transmit a resource access request to its control plane (e.g., 118) to request access to another resource (e.g., R2) that resides in different tenancy (e.g., tenancy-2 106) in the CSPI. In this case, the stacked resource handler 116 for the resource R2 in the control plane 114 performs a check to determine if the stack mapping information that it stores for resource R2 indicates that the resource identifier for R2 is mapped to the resource identifier for R3. If the stack mapping information indicates a valid mapping between the resource identifier of R2 and the resource identifier of R3, the stack resource handler validates the request so that R3 is able to access R2. Details related to the processing performed by a stacked resource handler for identifying one or more additional resources that are involved in the provisioning of a resource and the processing performed by a stacked resource handler for validating resource requests are described in detail in FIG. 2 and FIG. 3.

In certain embodiments, a resource provisioned in a tenancy of the CSPI 102 may interact with an identity management system 114 in the CSPI to obtain a resource principal identity for itself or to obtain a resource principal identity for a resource that is higher up in its resource hierarchy. A resource principal identity, also referred to throughout this disclosure as a resource principal token (RPT) is a secure identity provided to a cloud infrastructure resource that enables a resource to be authorized to access other cloud infrastructure resources within the CSPI. Details related to the interaction between the resources provisioned in the tenancies of the CSPI depicted in FIG. 1 and the identity management system 114 are described below with respect to FIG. 2 and FIG. 3 and its accompanying description.

Computing environment 100 depicted in FIG. 1 is merely an example and is not intended to unduly limit the scope of claimed embodiments. One of ordinary skill in the art would recognize many possible variations, alternatives, and modifications. For example, in some implementations, the CSPI 102 within the computing environment 100 can be implemented using more or fewer tenancies than those shown in FIG. 1, may combine two or more tenancies, or may have a different configuration or arrangement of tenancies. Additionally, a tenancy may include capabilities to provision additional resources than those depicted in FIG. 1. The identity management system 112 depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device).

Figure 2:
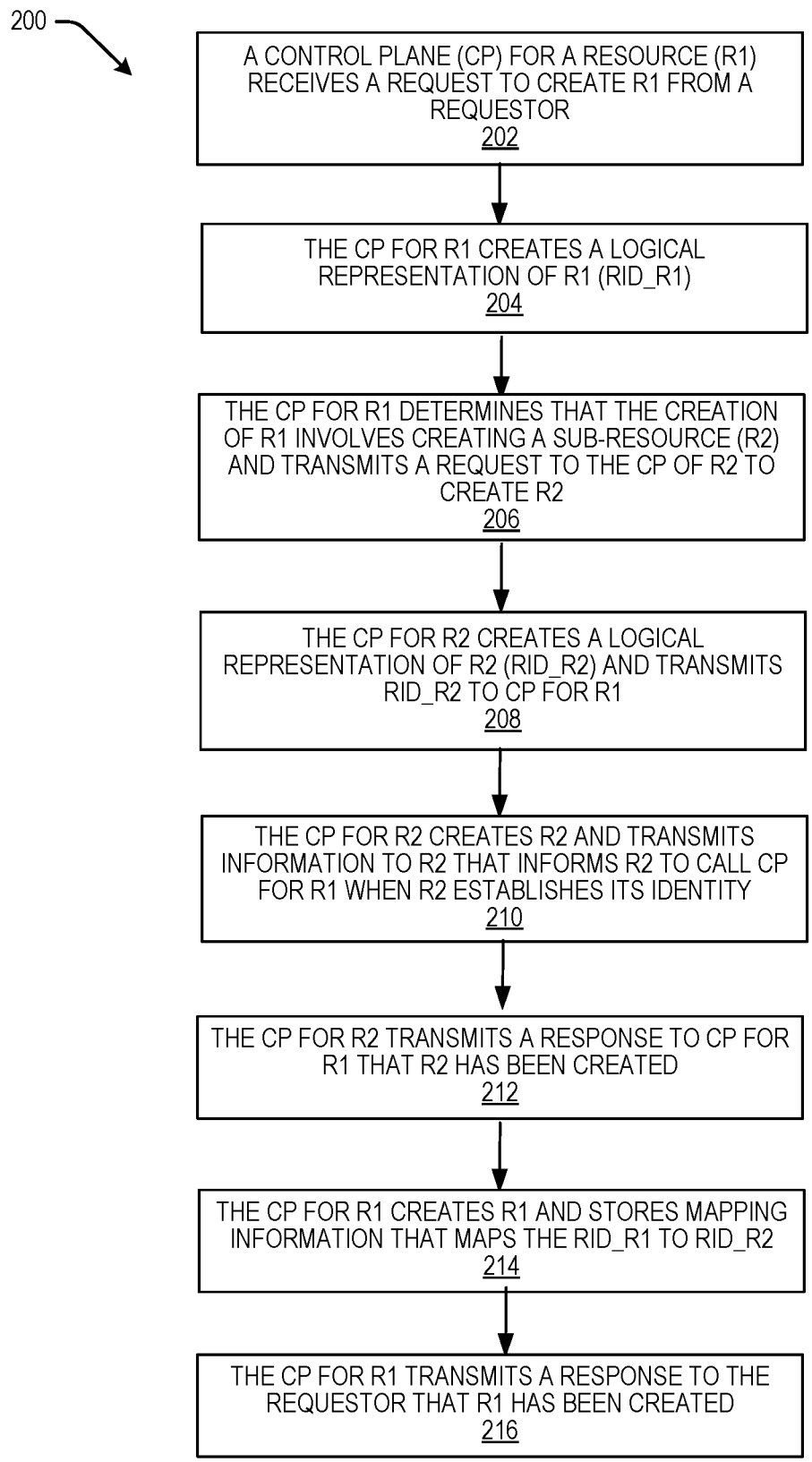
FIG. 2 depicts an example of a process for creating a resource in a tenancy of the CSPI, according to certain embodiments.

FIG. 2 depicts an example of a process 200 for creating a resource in a tenancy of the CSPI, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2 may be performed by a control plane (e.g., CP R1 110) that is responsible for creating a resource (e.g., R1) in a tenancy (e.g., tenancy-1 104) of the CSPI 102. For example, the resource R1 may correspond to a FA resource that is created in tenancy-1 104 of the CSPI 102.

At block 202, processing is initiated when the control plane for the resource R1 (CP R1) 110 receives a request to create R1 in a tenancy-1 104 of the CSPI 102. The request may be received, for example, from a user (e.g., a customer or an administrator) of the CSPI. In certain examples, the request may also be automatically generated by an internal service of the CSPI that includes capabilities for creating a resource in tenancy-1 104 of the CSPI 102.

Upon receiving the request, at block 204, CP R1 110 creates a logical representation of the resource R1 with a resource identifier (Rid_R1). As described herein, a resource identifier for a resource is a unique identifier that is used to identify a resource created in a tenancy. In a specific implementation, the resource identifier may represent an Oracle® Cloud Identifier (OCID) that is assigned to a cloud infrastructure resource provisioned in the CSPI.

At block 206, the CP R1 110 determines that the creation of R1 involves creating another resource (R2). In a certain implementation, the resource R2 may represent a sub-resource (i.e., a child resource) upon which resource R1 is being built. For instance, if resource R1 corresponds to an FA resource, resource R2 may correspond to a sub-resource (e.g., a database resource) that is composed within the FA resource. In certain implementations, the resource R2 may be created in another tenancy (e.g., tenancy-2 106) in the CSPI. For example, tenancy-2 may represent a service tenancy in the CSPI that is responsible for creating and managing resource R2. As part of the processing performed in block 206, CP R1 transmits a request to CP R2 114 to create R2.

At block 208, CP R2 114 creates a logical representation of R2 with a resource identifier (Rid_R2). For example, the resource identifier Rid_R2 may represent a unique identifier used to identify a database resource upon which the higher level FA resource (R1) is built. CP R2 114 then transmits the resource identifier (Rid_R2) to CP R1 110.

At block 210, CP R2 114 creates the resource R2. As part of resource creation, CP R2 transmits information (e.g., code, instructions, program) to R2 that identifies a type of computing resource (e.g., a virtual machine (VM) along with disk storage, a zip file, a doc image, a code bundle and so on) to be allocated for provisioning R2. For instance, the creation of R2 may involve provisioning an instance of a database resource. The provisioning of this resource may involve allocating a virtual machine (VM) along with disk storage. In certain embodiments, the information transmitted by CP R2 additionally includes logic (e.g., code, instructions, program) that informs R2 to call CP R1 110 when establishing its (i.e., R2's) resource principal identity (i.e., RPT). In a certain implementation, this logic may be executed by an application 115 executing inside the resource R2 as shown in FIG. 1. During creation of R2, the application 115 may retrieve this code from a storage location (e.g., object storage) and execute the code as part of the provisioning process. In certain examples, the creation (provisioning) of the resource R2 by CP R2 114 at step 210 may be performed in parallel with the creation of the resource identifier Rid_R2. In other examples, the creation of the resource R2 may be performed sequentially after the logical representation of R2 (Rid_R2) has been created.

As previously described, the RPT is a secure identity provided to a cloud infrastructure resource that enables the resource to be authorized to access other cloud infrastructure resources within the CSPI. Using its RPT, a sub-resource (e.g., R2) residing in a particular tenancy (e.g., tenancy-2) of the CSPI can obtain the RPT of a higher level resource (e.g., R1) that is built on top of resource R2, where R1 resides in a different tenancy (tenancy-1) of the CSPI. Using the RPT of the higher level resource R1, the resource R2 can then access other resources that reside in the tenancy of R1 without having to make a cross-tenancy policy call.

For instance, the sub-resource R2 residing in a tenancy-2 (e.g., a service tenancy) of the CSPI may want to access a customer-owned resource (e.g., an encryption key) residing in tenancy-1, where tenancy-1 may correspond to a customer tenancy of the CSPI. The resource R2 may represent a sub-resource (database resource) that is composed within a higher-level resource R1 (FA resource), where R1 is created in the customer tenancy of the CSPI. Since R2 resides in a service tenancy, when R2 tries to access a customer-owned resource (e.g., an encryption key) residing in the customer tenancy, a cross-tenancy policy call is typically required to be made by R2 for R2 to be able to access the customer-owned resource.

Existing approaches for enabling a sub-resource (e.g., R2) that is composed within a higher-level resource (e.g., R1) to access to another resource (e.g., a customer-owned resource) that resides in a tenancy that is different from the tenancy that R2 resides in typically involves the implementation of a cross-tenancy policy statement to enable the sub-resource to successfully be able to access other resources that reside in the different tenancy. Writing a cross-tenancy policy statement typically involves the resource principal identities of both the sub-resource and the other resources that reside in the other tenancy to be made available to a user (e.g., a customer or an administrator) of the CSPI so that the sub-resource can be provided with permissions to access the other resources. Exposing the resource principal identities of resources is not ideal and can potentially compromise the security of cloud resources.

The various embodiments described in the present disclosure address the deficiencies of existing approaches for providing secure resource access by disclosing a system that includes capabilities by which a resource residing in a first tenancy of the CSPI can access resources residing in a second tenancy of the CSPI without the use of a cross-tenancy policy call. The system provides the ability for a resource residing in the first tenancy to obtain the resource principal identity of its higher-level resource, where the higher-level resource resides in a second tenancy of the CSPI. The resource can then use the identity of the higher-level resource to access other resources residing in the second tenancy of the CSPI without the use of a cross-tenancy policy statement. In certain implementations, the first tenancy may correspond to a service tenancy of the CSPI and the second tenancy may correspond to a customer tenancy of the CSPI. In other implementations, both the first tenancy and the second tenancy of the CSPI may correspond to different service tenancies of the CSPI.

For instance, continuing with the example of resources R1 and R2 described above, in accordance with the disclosed embodiments, by obtaining the resource principal identity of the higher-level resource R1 on top of which sub-resource R2 is built, the sub-resource R2 residing in tenancy-2 of the CSPI is able to access resources residing in tenancy-1 of the CSPI without the use of a cross-tenant policy call. Using the resource principal identity of its higher-level resource, the sub-resource R2 is provided with the same permissions as its higher-level resource to access other resources that reside in tenancy-1. The sub-resource R2 can access the other resources in a seamless way using a generic policy associated with the high-level resource that provides permission for the higher-level resource to interact with other resources. A user of the CSPI does not have to write a separate cross-tenancy policy statement that provides permission to the sub-resource to access the other resources.

Returning to the discussion of FIG. 2, at block 212, CP R2 114 transmits a response to CP R1 110 that resource R2 has been created.

At block 214, CP R1 110 creates the resource R1 and stores mapping information that identifies a directional mapping between a resource identifier (Rid) of R1 and a resource identifier of a resource (R2). In a certain implementation, the stacked resource handler for R1 112 (shown in FIG. 1) creates a resource stack for R1 where R2 is placed at the bottom of the stack and R1 is placed at the top of the stack. The stacked resource handler for R1 112 additionally creates and stores mapping information that identifies a directional mapping between a resource identifier (Rid) of R1 and a resource identifier of a resource (R2).

At block 216, the CP R1 110 transmits a response to the requestor that R1 has been created.

The processing depicted in FIG. 2 described the creation of a cloud resource using a particular example of a Fusion Application (FA) resource created in a first tenancy of the CSPI where the creation of the FA resource involved the creation of a sub-resource (e.g., a database resource) in a different tenancy of the CSPI. In certain examples, and as previously described, for a Machine Learning (ML) cloud service, a tenancy (e.g., a service tenancy) provided for this service may include capabilities for provisioning a ML resource in the CSPI for building, training, deploying, and managing a machine learning model. The ML resource may be composed of one or more sub-resources such as pipeline resources and job run resources that represent child resources of the ML application. In a certain implementation, the resources involved in the provisioning of the ML resource may be hierarchically related to one another, where the Pipeline Run resource is a child resource of the ML application and the Job Run resource is a child resource of its parent Pipeline Run resource.

Figure 3:
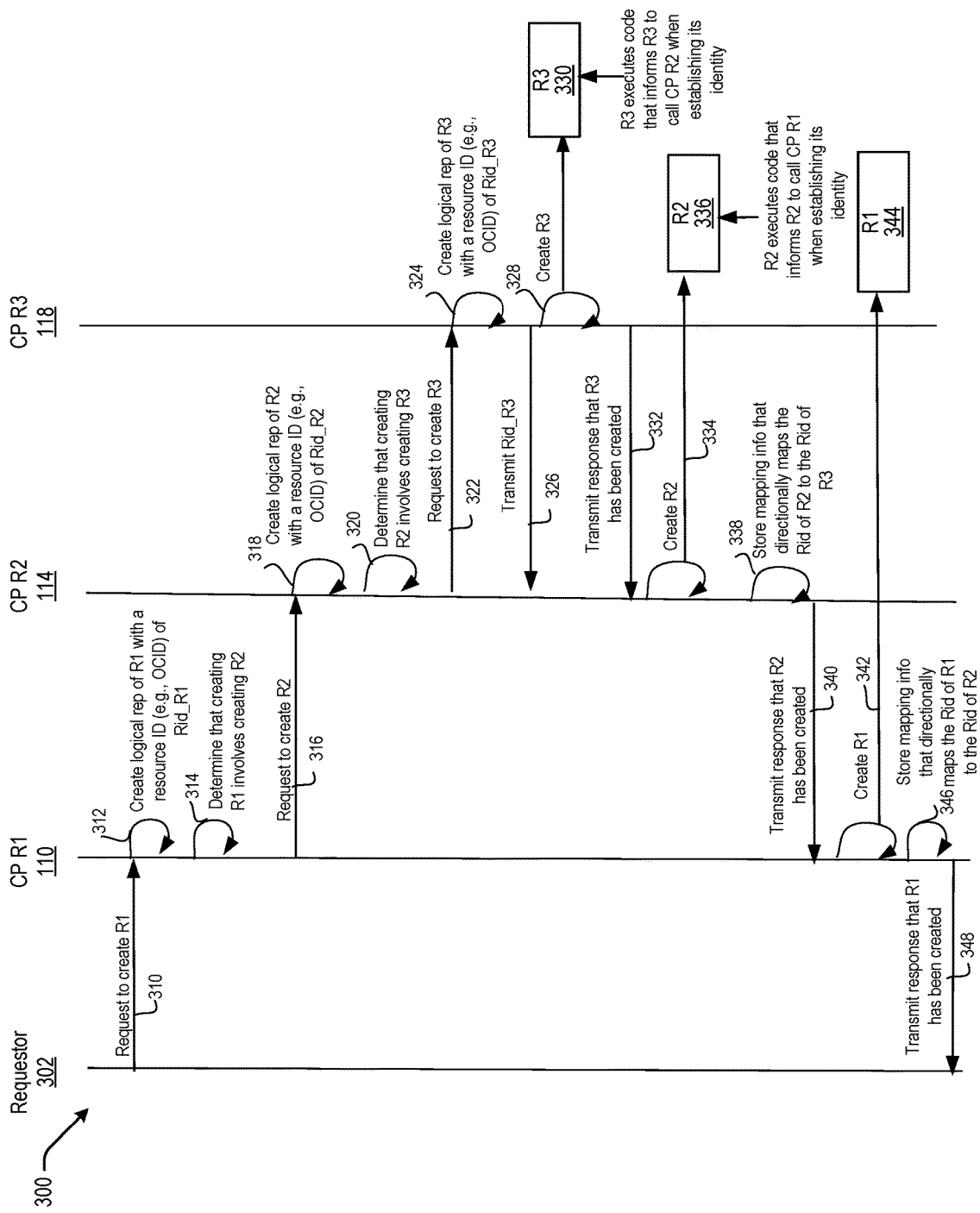
FIG. 3 is a sequence diagram illustrating a sequence of interactions performed by one or more control planes associated with one or more tenancies of the CSPI for creating a Machine Language (ML) resource, according to certain embodiments.

FIG. 3 is a sequence diagram illustrating a sequence of interactions performed by one or more control planes associated with one or more tenancies of the CSPI for creating a Machine Language (ML) resource, according to certain embodiments. In the example shown in FIG. 3, the resource R1 may correspond to a ML resource, the resource R2 may correspond to a pipeline sub-resource that is composed within the ML resource and the resource R3 may correspond to a Job Run sub-resource that is composed within the ML pipeline sub-resource.

In certain embodiments, processing is initiated at block 310 when the control plane for resource R1 (CP R1) 110 receives a request from a requestor to create R1 in a tenancy (e.g., tenancy-1 104) of the CSPI. In a certain implementation, tenancy-1 may correspond to a customer tenancy of the CSPI that is responsible for creating R1. For example, the requestor may represent a user (e.g., a customer or an administrator) of the CSPI. In other examples, the requestor may represent an internal service of the CSPI that includes capabilities for creating a resource in tenancy-1 104 of the CSPI 102.

At block 312, CP R1 110 creates a logical representation of R1 with a resource identifier (e.g., OCID) of Rid_R1. The resource identifier for resource R1 represents a unique identifier that is used to identify the resource R1 in tenancy-1 of the CSPI.

At block 314, CP R1 110 determines that creating R1 involves creating a sub-resource R2 and at block 316, CP R1 transmits a request to CP R2 114 to create R2. At block 318, CP R2 creates a logical representation of R2 with a resource identifier (e.g., OCID) of Rid_R2 in a second tenancy (e.g., tenancy-2 106) of the CSPI. The resource identifier for resource R2 represents a unique identifier that is used to identify the resource R2 in tenancy-2 of the CSPI. In a certain implementation, tenancy-2 may correspond to a service tenancy of the CSPI that is responsible for creating R2.

At block 320, CP R2 114 determines that creating R2 involves creating a sub-resource R3. At block 322, CP R2 transmits a request to CP R3 to create R3. At block 324, CP R3 creates a logical representation of R3 with a resource identifier (e.g., OCID) of Rid_R3 in a third tenancy (e.g., tenancy-3 108) of the CSPI. The resource identifier for resource R3 represents a unique identifier that is used to identify the resource R3 in tenancy-3 of the CSPI. In a certain implementation, tenancy-3 may correspond to another service tenancy of the CSPI that is responsible for creating R3.

At block 326, CP R3 118 transmits the Rid_R3 to CP R2. At block 328, CP R3 creates R3. As part of resource creation, CP R3 transmits information (e.g., code, instructions, program) to R3 that identifies a type of computing resource (e.g., a virtual machine (VM) along with disk storage, a zip file, a doc image, a code bundle and so on) to be allocated for provisioning R3. For instance, if R3 corresponds to a Job Run resource, the creation of R3 may involve provisioning an instance of the Job Run resource by allocating a compute instance (such as CPU or GPU) based on the block volume, shape, and network configuration of the job required for model building.

In certain embodiments, the information transmitted by CP R3 additionally includes logic (e.g., code, instructions, program) that informs R3 to call CP R2 114 when establishing its (i.e., R3's) resource principal identity (i.e., RPT). In a certain implementation, this logic may be executed by an application 121 running inside the resource R3 as shown in FIG. 1. During creation of R3, the application 121 may retrieve the code from a storage location (e.g., object storage) and execute the code as part of the provisioning process. In certain examples, the creation (provisioning) of the resource R3 by CP R3 118 may be performed in parallel with the creation of the resource identifier Rid_R3. In other examples, the creation of the resource R3 may be performed sequentially after the logical representation of R3 (Rid_R3) has been created. Using its RPT, a resource (e.g., R3) residing in a particular tenancy (e.g., tenancy-3) of the CSPI can obtain the RPT of a higher level resource (e.g., R2) that is built on top of resource R3, where R2 resides in a different tenancy (tenancy-2) of the CSPI.

At block 332, CP R3 transmits a response to CP R2 that R3 has been created. At block 334, CP R2 creates R2. As part of resource creation, CP R2 transmits information (e.g., code, instructions, program) to R2 that identifies a type of computing resource (e.g., a virtual machine (VM) along with disk storage, a zip file, a doc image, a code bundle and so on) to be allocated for provisioning R2. For instance, if R2 corresponds to a Pipeline Run resource, the creation of R2 may involve provisioning an instance of the Pipeline Run resource by allocating a data storage resource required for model building.

In certain embodiments, the information transmitted by CP R2 additionally includes logic (e.g., code, instructions, program) that informs R2 to call CP R1 110 when establishing its (i.e., R2's) resource principal identity (i.e., RPT). In a certain implementation, this logic may be executed by an application 115 running inside the resource R2 as shown in FIG. 1. During creation of R2, the application 115 may retrieve the code from a storage location (e.g., object storage) and execute the code as part of the provisioning process. In certain examples, the creation (provisioning) of the resource R2 by CP R2 114 may be performed in parallel with the creation of the resource identifier Rid_R2. In other examples, the creation of the resource R2 may be performed sequentially after the logical representation of R2 (Rid_R2) has been created. Using its RPT, a resource (e.g., R2) residing in a particular tenancy (e.g., tenancy-2) of the CSPI can obtain the RPT of a higher level resource (e.g., R1) that is built on top of resource R2, where R1 resides in a different tenancy (tenancy-1) of the CSPI At block 338, CP R2 stores mapping information that identifies a directional mapping between the Rid_R2 and the Rid_R3. At block 340, CP R2 transmits a response to CP R1 that R2 has been created. As part of resource creation, CP R1 transmits information (e.g., code, instructions, program) to R1 that identifies a type of computing resource (e.g., a virtual machine (VM) along with disk storage, a zip file, a doc image, a code bundle and so on) to be allocated for provisioning R1. At block 342, CP R1 creates R1. At block 344, CP R1 stores mapping information that identifies a directional mapping between the Rid_R1 and the Rid_R2. At block 346, CP R1 transmits a response to the source of the request that R1 has been successfully created.

Figure 4:
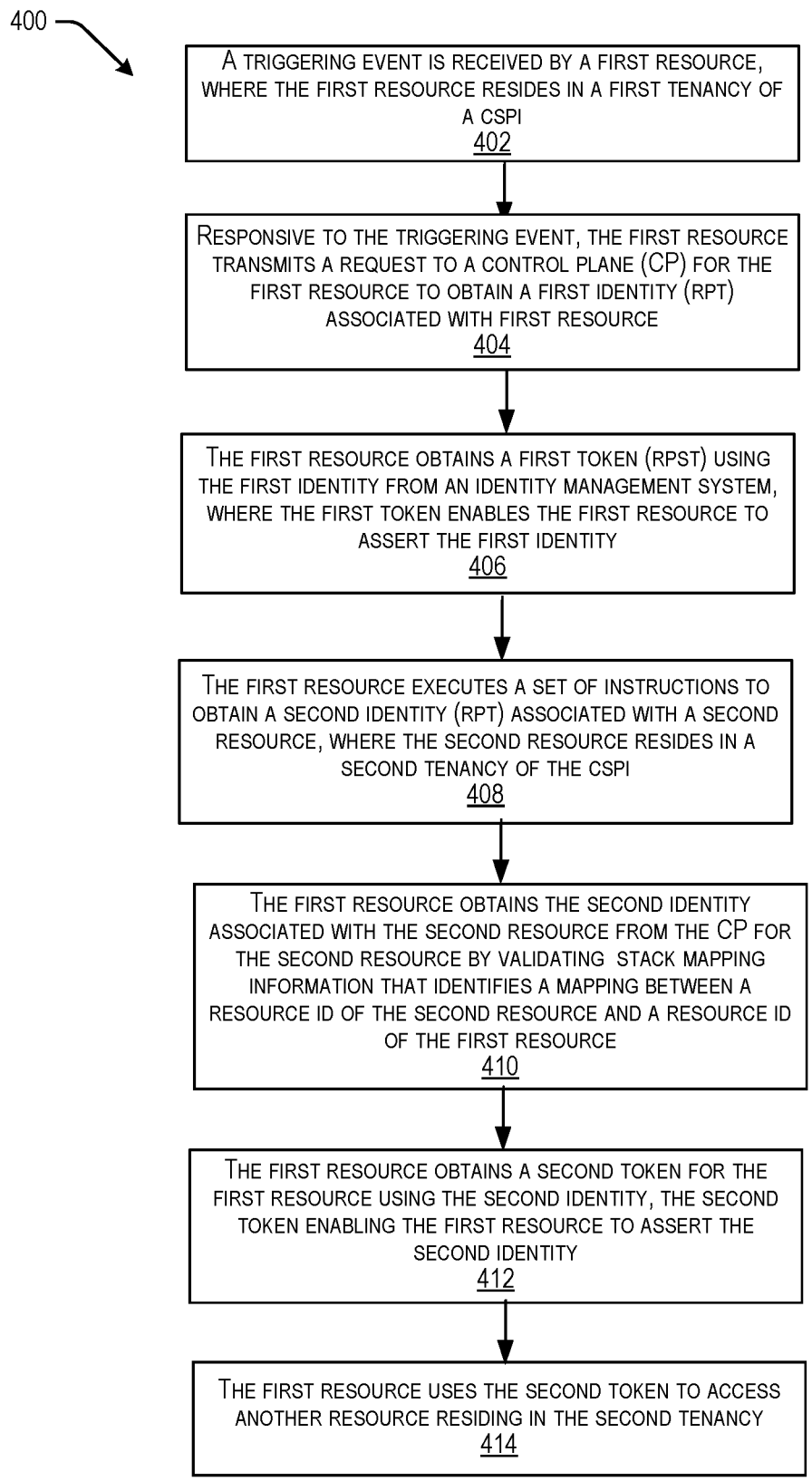
FIG. 4 depicts an example of a process performed by a first resource residing in a first tenancy of the CSPI to access a second resource residing in a second tenancy of the CSPI without making a cross-tenancy policy call, according to certain embodiments.
Figure 5:
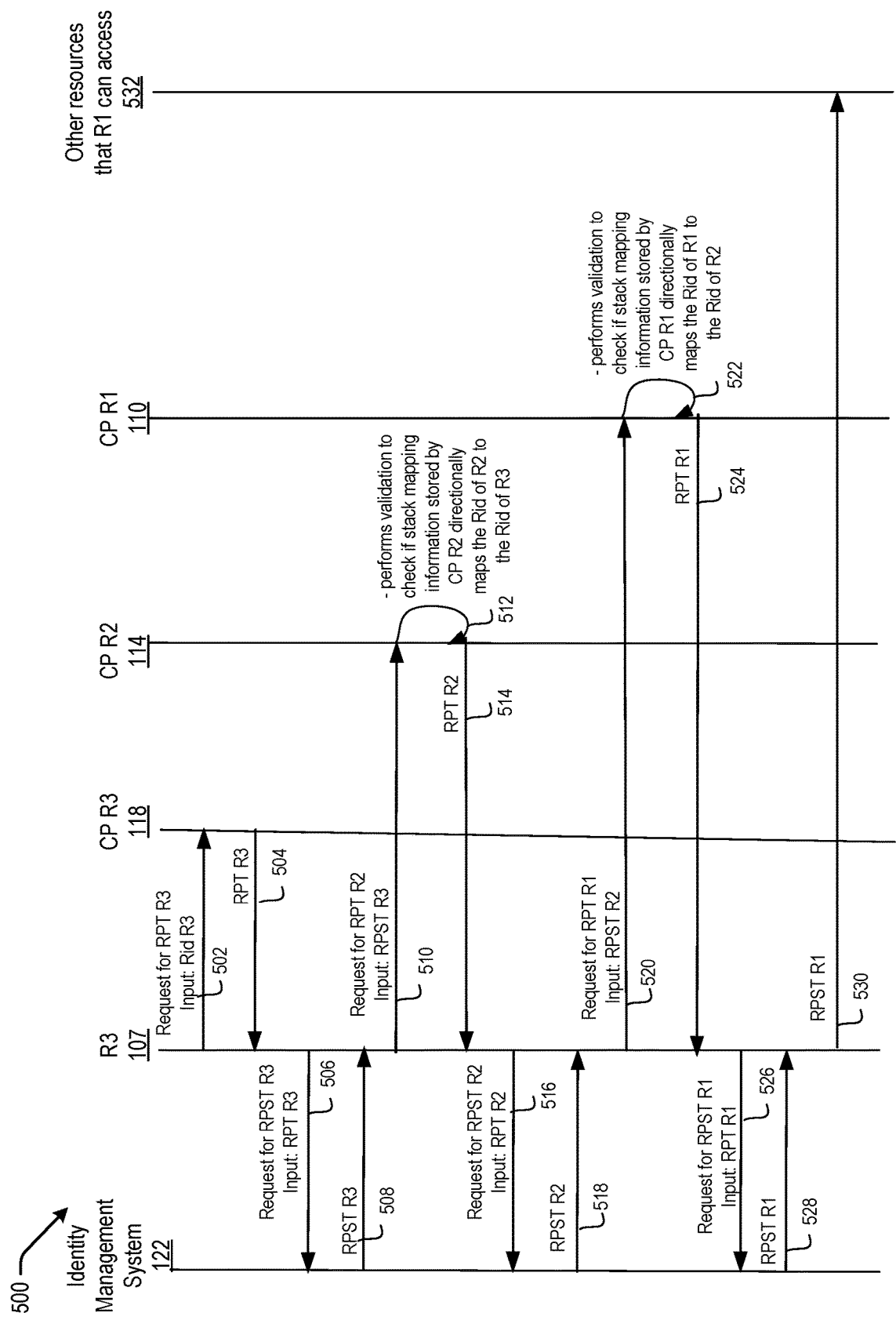
FIG. 5 is a sequence diagram that depicts a set of operations performed by a resource residing in one tenancy of the CSPI to access another resource residing in a different tenancy of the CSPI without making a cross-tenancy policy call, according to certain embodiments.

As described above, the CSPI described above additionally includes capabilities by which a resource residing in a first tenancy of the CSPI can access other resources residing in a second tenancy of the CSPI without the use of a cross-tenancy policy call. By obtaining the resource principal identity of a higher-level resource upon which the resource is built, the resource can then use the identity of the higher-level resource to access other resources residing in the second tenancy of the CSPI without the sub-resource making a cross-tenancy policy call. FIG. 4 and FIG. 5 described below depict processing performed by a resource that resides in a first tenancy of the CSPI to access a second resource that resides in a second tenancy of the CSPI without making a cross-tenancy policy call.

FIG. 4 depicts an example of a process 400 performed by a first resource residing in a first tenancy of the CSPI to access a second resource residing in a second tenancy of the CSPI without making a cross-tenancy policy call, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing in blocks 404-414 depicted in FIG. 4 may be performed by a system (e.g., a virtual machine) that is provisioned for the resource in its tenancy.

At block 402, processing is initiated when a triggering event is received for a first resource provisioned in a first tenancy of the CSPI. For instance, the first resource may correspond to a resource R3 107 that resides in tenancy-3 108 of the CSPI. In certain examples, the first resource may receive a triggering event when the system (e.g., virtual machine) provisioned for the first resource is booted up and becomes available for a user of the CSPI to run applications for services provided by the CSPI. In other examples, a triggering event may represent a request that is transmitted by the first resource to request access to another resource that resides in a tenancy of the CSPI that is different from the tenancy (e.g., the first tenancy) that the first resource resides in. For instance, the first resource may reside in a service tenancy associated with the CSPI and may wish to access a resource that resides in the second tenancy associated with the CSPI where the second tenancy may represent a customer tenancy associated with the CSPI.

At block 404, responsive to receiving triggering event, the first resource transmits a request to a control plane for the first resource to obtain a first identity associated with the first resource. In certain examples, the first identity associated with the first resource may correspond to a resource principal identity (RPT) associated with the first resource.

At block 406, the first resource obtains a first token using the first identity from an identity management system. The first token enables the first resource to assert the first identity. and corresponds to a resource principal session token (RPST) associated with the first resource. The RPST for a resource is a temporary session token and a secure credential that enables the resource to authenticate itself (assert its resource principal identity) to other cloud-resources owned by the CSPI. In a certain implementation, the RPST may be formatted as a Json Web Token (JWT) token that includes claims that identify the resource's host tenancy and compartment information.

At block 408, the first resource executes a set of instructions to obtain a second identity associated with a second resource. The second identity may correspond to a resource principal identity (RPT) associated with the second resource. In certain examples, the second resource may correspond to a higher-level resource upon which the first resource is built. The second resource may reside in a different tenancy of the CSPI. For example, the second resource may correspond to a resource R2 105 that resides in tenancy-2 106 of the CSPI.

At block 410, the first resource obtains the second identity associated with the second resource from the control plane for the second resource by validating stack mapping information that identifies a mapping between a resource identifier of the second resource and the resource identifier of the first resource.

At block 412, the first resource obtains a second token for the first resource using the second identity. The second token enables the first resource to assert the second identity. In a certain implementation, the second token corresponds to a resource principal session token (RPST) associated with the second resource.

At block 414, the first resource uses the second token to access other resources that reside in the second tenancy of the CSPI.

Additional details related to the operations performed by a resource residing in one tenancy of the CSPI to access another resource residing in a different tenancy of the CSPI without the resource making a cross-tenancy policy call are now described using the following example depicted in FIG. 5.

FIG. 5 is a sequence diagram that depicts a set of operations performed by a resource residing in one tenancy of the CSPI to access another resource residing in a different tenancy of the CSPI without making a cross-tenancy policy call, according to certain embodiments. In certain embodiments, such as in the embodiment depicted in FIG. 1, the resource R3 107 depicted in FIG. 5 is part of a resource hierarchy comprising resources R2 and R1. The resources R1, R2, and R3 are hierarchically related to one another where R1 represents the highest-level resource in the hierarchy and R2 and R3 represent sub-resources in the hierarchy. Additionally, R2 and R3 are hierarchically related where R3 is a child resource (sub-resource) of R2.

In the embodiment depicted in FIG. 5, processing is initiated at operation 502 when resource R3 107 transmits a request to its control plane CP R3 118 to request for a resource principal identifier (i.e., an RPT) for R3. In a certain implementation, and as described in FIG. 1, resource R3 may reside in a tenancy-3 108 of the CSPI where tenancy-3 108 corresponds to a service tenancy of the CSPI. In certain examples, as part of the request transmitted by R3 at operation 502, R3 provides, as input, its resource identifier (Rid_R3) to CP R3.

At operation 504, CP R3 obtains an RPT for R3 and transmits the RPT of R3 to R3. In a certain implementation, the RPT is obtained by CP R3 using software (e.g., code, instructions, program) that is executed by an application running inside a system (e.g., a virtual machine) provisioned for the resource R3. For example, the software may represent a collection of software development kit (SDK) tools that includes capabilities for obtaining a RPT for a resource for its corresponding control plane.

Upon receiving its RPT, at operation 506, R3 transmits a request to the Identity Management System (IDM) (e.g., 122 described in FIG. 1) to obtain a Resource Principal Session Token (RPST) for R3. In certain examples, the RPST for a resource represents a temporary session token and a secure credential associated with the resource that is provided by the IDM to the resource. Using the RPST, a resource is able to assert its resource principal identity (RPT) to other cloud-resources and services owned by the CSP. In a certain implementation, the RPST may be formatted as a Json Web Token (JWT) token that includes claims that identify the resource's host tenancy and compartment information.

At operation 508, the IDM exchanges the RPT for the resource R3 for the RPST of R3 and at operation 508, the IDM transmits the RPST of R3 to R3. Upon receiving its RPST from the IDM, resource R3 determines that it needs to obtain the RPT of a resource that is in the next-level of its resource hierarchy by executing code implemented by an application (e.g., 121) running inside R3 as shown in FIG. 1 As previously described, during resource creation of R3, information is transmitted by the control plane of R3 that informs R3 to call the control plane of the resource that is in the next-level of its resource hierarchy when R3 establishes its identity. In certain examples, the information that is transmitted comprises a set of instructions (code) that is executed by the application 121 implemented within resource R3 when R3 receives its RPST from the IDM.

At operation 510, resource R3 transmits a request to the control plane of R2 (CP R2) to request for the RPT of resource R2 that is in the next-level of its resource hierarchy. In certain examples, as part of the request transmitted by R3 at operation 510, R3 provides, as input, its RSPT to CP R2.

At operation 512, CP R2 performs a validation to check if the stack mapping information stored by the stacked resource handler for CP R2 identifies a directional mapping between the Rid of R2 and the Rid for R3. If the stack mapping information indicates a valid mapping between the resource identifier of R2 and the resource identifier of R3, the stack resource handler for CP R2 validates the request and at operation 514, CP R2 provides R3 with the RPT of R2.

At operation 516, R3 transmits a request to the IDM to obtain an RPST for R2 by providing, as part of the request, the RPT of R2. At operation 518, the IDM exchanges the RPT for the resource R2 for the RPST of R2 and at operation 518, the IDM transmits the RPST of R2 to R3.

Upon receiving the RPST of R2 from the IDM, resource R3 obtains the identity of resource R2 and determines that it needs to obtain the RPT of a resource that is in the next-level of its resource hierarchy (i.e., R1). Since R3 has obtained (or assumed) the identity of R2, R3 can use the identity of R2 to obtain the RPT of R1 by executing code implemented by an application (e.g., 115) running inside R2 as shown in FIG. 1 As previously described, during resource creation of R2, information is transmitted by the control plane of R2 that informs R2 to call the control plane of the resource that is in the next-level of its resource hierarchy (i.e., R1) when R2 establishes its identity. In certain examples, the information that is transmitted comprises a set of instructions (code) that is executed by the application 115 implemented within resource R2 when R3 receives the RPST of R2 from the IDM.

At operation 520, R3, using the identity of R2 (i.e., RPST R2) transmits a request to the control plane of R1 (CP R1) to obtain the RPT of R1 by providing, as part of the request, the RPST of R2 to CP R1. At operation 522, CP R1 performs a validation to check if the stack mapping information stored by the stacked resource handler for CP R1 identifies a directional mapping between the Rid of R1 and the Rid for R2. If the stack mapping information indicates a valid mapping between the resource identifier of R1 and the resource identifier of R2, the stack resource handler for CP R1 validates the request and at operation 524, CP R1 provides R3 with the RPT of R1.

At operation 526, R3 transmits a request to the IDM to obtain an RPST for R1 by providing, as part of the request, the RPT of R1. At operation 528, the IDM exchanges the RPT for the resource R1 for the RPST of R1 and at operation 528, the IDM transmits the RPST of R1 to R3.

The resource R3 thus obtains the RPST for a resource until it reaches the highest level or root level (in this example, resource R1) in the resource hierarchy. As a result of executing operation 528, the resource R3 has three RPSTs, a first RPST representing the identity of itself, a second RPST representing the identity of its parent resource (R2) and a third RPST representing the identity of its root resource R1. Since the third RPST represents the identity of highest-level (root) resource R1 in the resource hierarchy, the resource R3 uses the RPST of the resource R1 to assert its identity to access other resources 532 that reside in R1's tenancy. Since the resource R3 has an RPST that comprises tenancy information and a service identifier that belongs to a tenancy that R1 resides in, R3 is able to access the other resources residing in tenancy-1 without requiring the resource R3 to make a cross-tenancy call.

By obtaining the resource principal identity of a higher-level resource upon which a resource is built, the resource residing in a particular tenancy of the CSPI is provided with the same permissions as its higher-level resource. Using the resource principal identity of its higher-level resource, the resource can access other resources that reside in another tenancy of the CSPI without making a separate cross-tenancy policy call that provides permission to the resource to access the other resources that reside in the other tenancy. Using the capabilities provided by the disclosed system, an administrator of a tenancy in a CSPI does not have to write separate policies directed to various sub-resources that are composed within a resource where the details (e.g., resource principal identities) of the sub-resources can be potentially exposed to the administrators of various tenancies within the CSPI.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
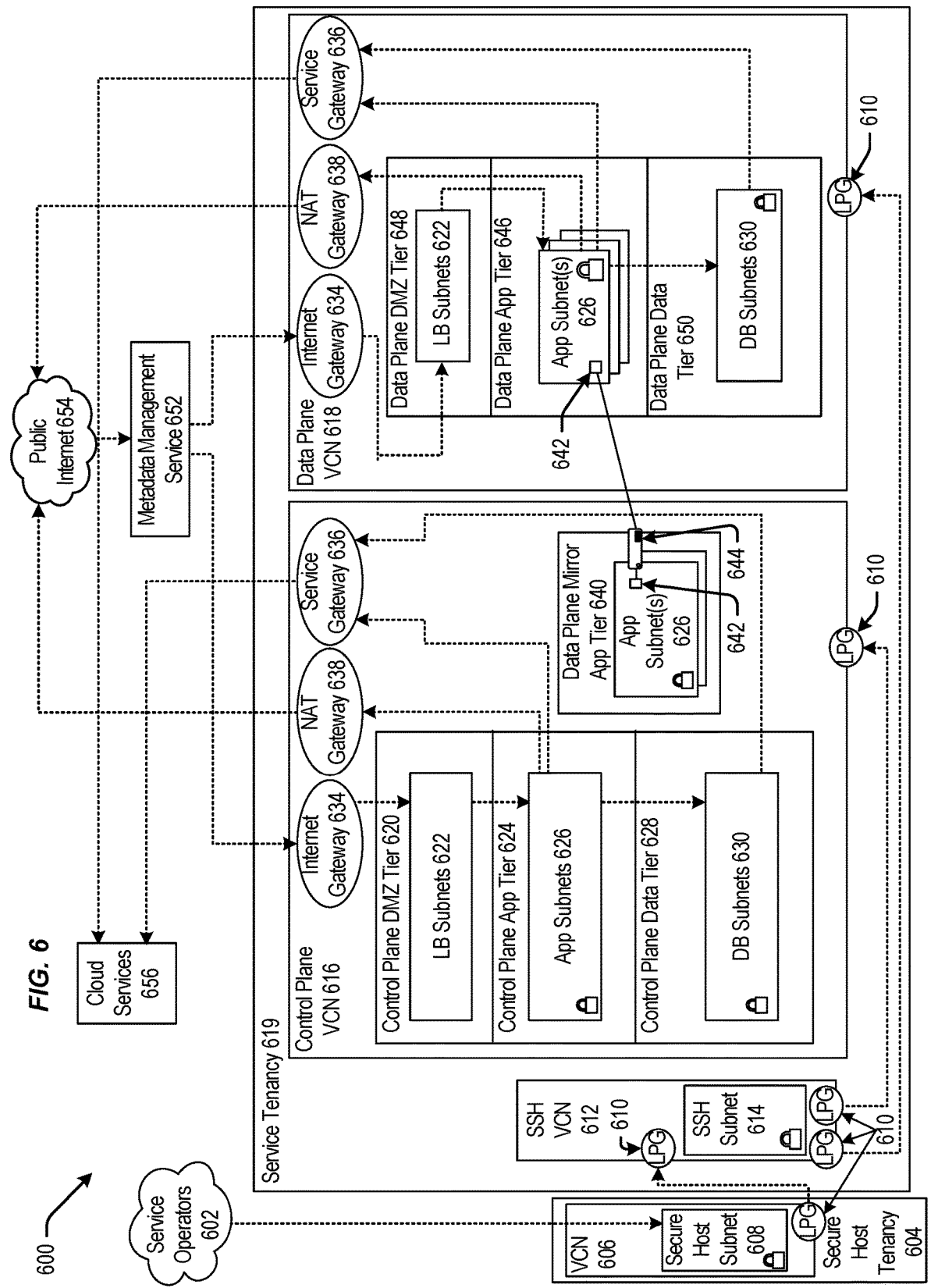
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
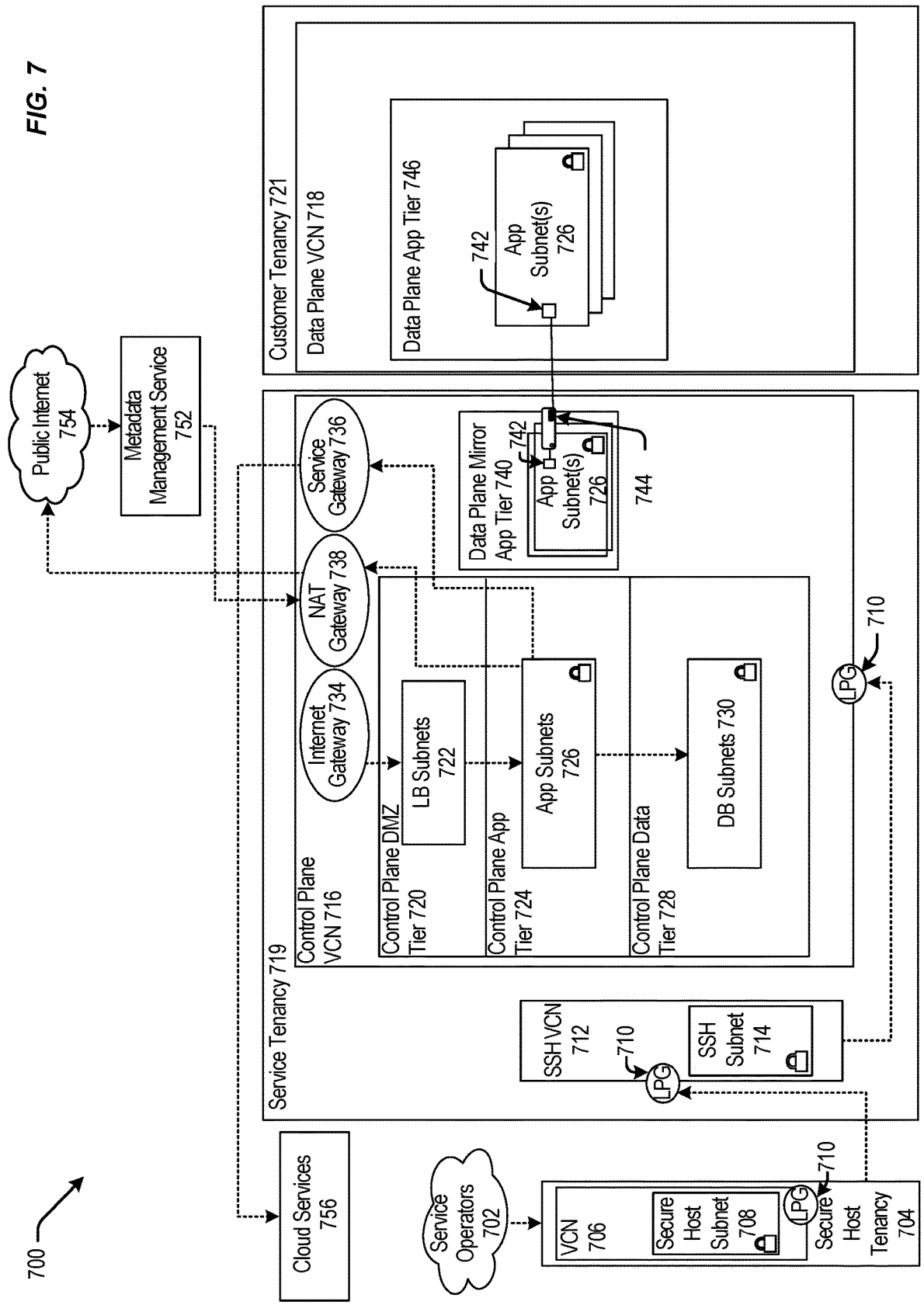
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG.

6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
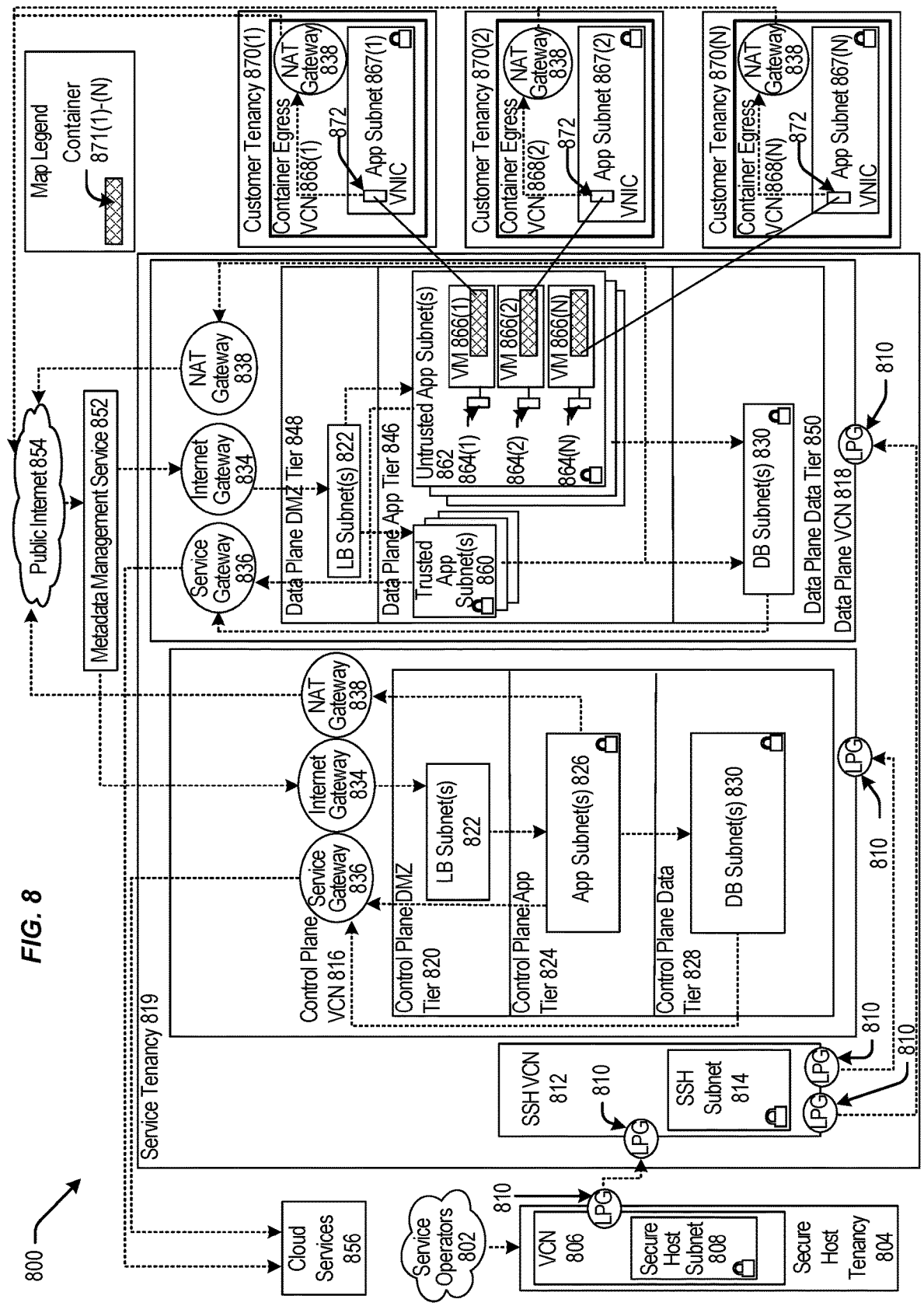
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824

(e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
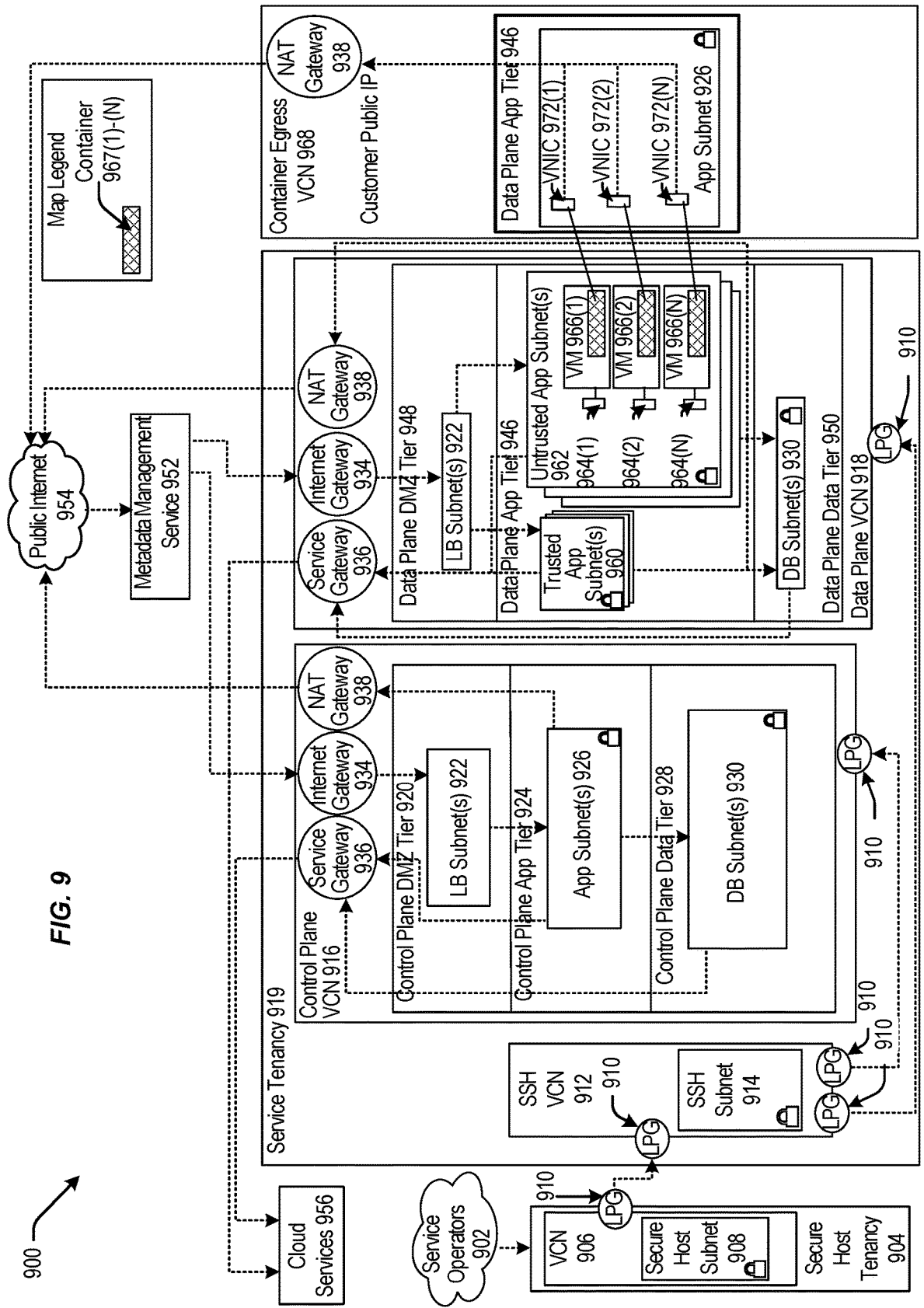
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
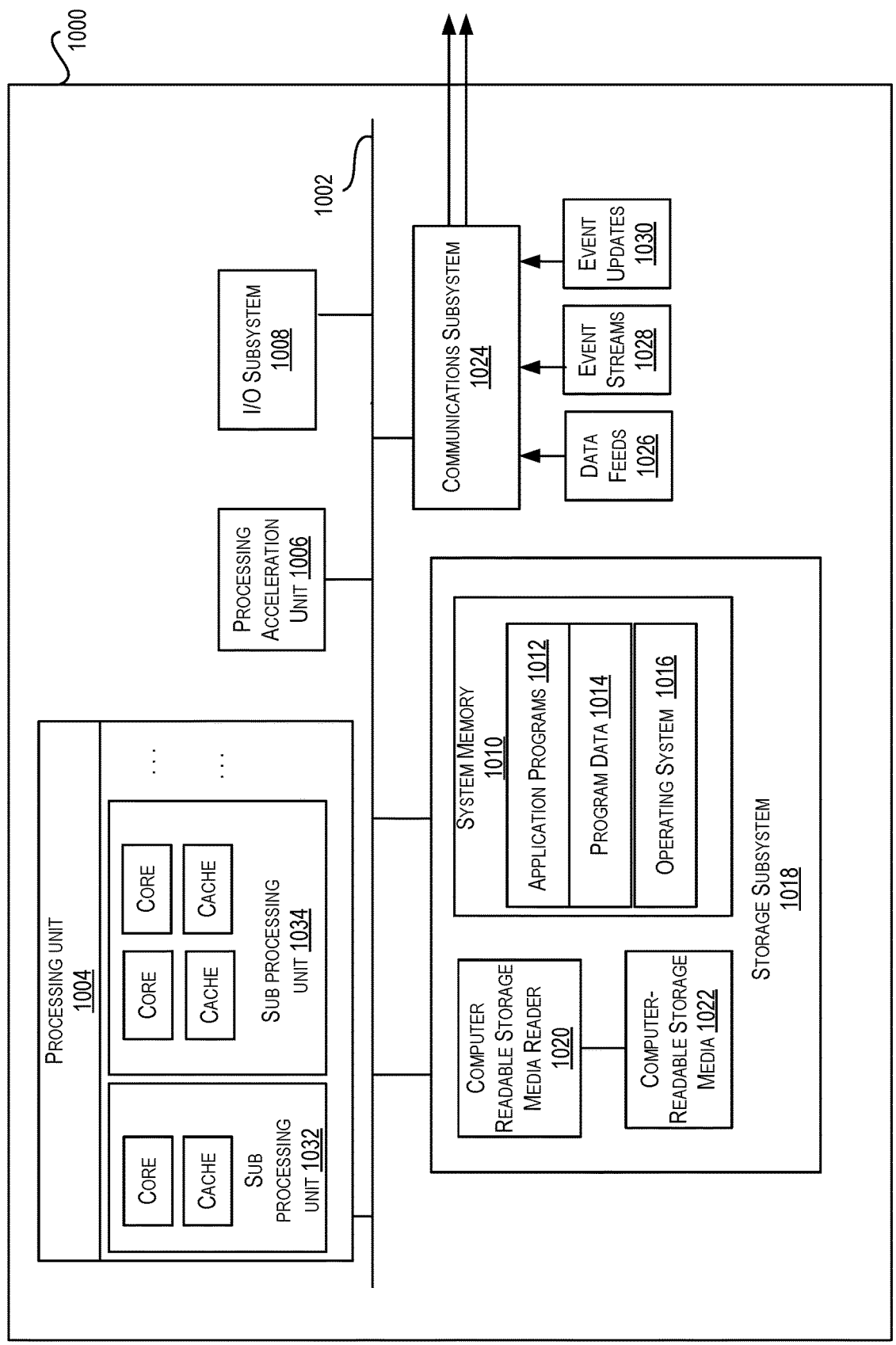
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   obtaining, for a first resource, a first identity associated with the first resource, the first resource provisioned in a first tenancy of a plurality of tenancies provided by a cloud service provider infrastructure (CSPI);
   obtaining, for the first resource, a first token for the first resource, the first token enabling the first resource to assert its first identity;
   executing, for the first resource, a set of instructions to obtain a second identity associated with a second resource upon which the first resource is built, the second resource residing in a second tenancy of the plurality of tenancies provided by the CSPI;
   obtaining, for the first resource, the second identity associated with the second resource, the second identity associated with the second resource obtained by validating stack mapping information that identifies a mapping between a resource identifier of the second resource and a resource identifier of the first resource;
   obtaining, for the first resource, a second token for the first resource, the second token enabling the first resource to assert its second identity; and
   using, by the first resource, the second token to access one or more other resources, wherein the one or more other resources reside in the second tenancy of the plurality of tenancies provided by the CSPI.

2. The method of claim 1, wherein the first identity for the first resource is obtained from a control plane that is responsible for creating the first resource in the first tenancy of the CSPI.

3. The method of claim 1, wherein the first identity represents a resource principal identity associated with the first resource that enables the first resource to be authorized to access a plurality of cloud resources provided by the CSPI.

4. The method of claim 1, wherein the first token represents a resource principal session token associated with the first resource that represents a temporary session token and a secure credential associated with the first resource that enables the first resource to authenticate itself to a plurality of cloud resources provided by the CSPI.

5. The method of claim 1, wherein the stack mapping information is stored by a control plane that is responsible for creating the second resource in the second tenancy of the plurality of tenancies of the CSPI, and wherein the stack mapping information is implemented as a resource stack by the control plane.

6. The method of claim 5, wherein the stack mapping information stored by the control plane identifies a directional mapping between the resource identifier of the second resource and the resource identifier of the first resource.

7. The method of claim 1, wherein the set of instructions comprises code that is executed by an application associated with first resource that informs the first resource to call a control plane of the second resource to obtain the second identity of the second resource.

8. The method of claim 1, wherein the second identity represents a resource principal identity associated with the second resource that enables the second resource to be authorized to access a plurality of cloud resources provided by the CSPI.

9. The method of claim 1, wherein the second token represents a resource principal session token associated with the second resource that represents a temporary session token and a secure credential associated with the second resource that enables the second resource to authenticate itself to a plurality of cloud resources provided by the CSPI.

10. The method of claim 1, wherein the first tenancy of the plurality of tenancies provided by the CSPI represents a service tenancy of the CSPI, wherein the service tenancy represents a provisioning platform for provisioning, configuring, and managing a plurality of cloud resources associated with a plurality of cloud services provided by the CSPI.

11. The method of claim 1, wherein the second tenancy of the plurality of tenancies provided by the CSPI represents a customer tenancy of the CSPI, wherein the customer tenancy represents an account created for a customer of the CSPI that subscribes to one or more services provided by the CSPI.

12. A system comprising:
a memory; and
one or more processors configured to perform processing, the processing comprising:
    obtaining, for a first resource, a first identity associated with the first resource, the first resource provisioned in a first tenancy of a plurality of tenancies provided by a cloud service provider infrastructure (CSPI);
    obtaining, for the first resource, a first token for the first resource, the first token enabling the first resource to assert its first identity;
    executing, for the first resource, a set of instructions to obtain a second identity associated with second resource upon which the first resource is built, the second resource residing in a second tenancy of the plurality of tenancies provided by the CSPI;
    obtaining, for the first resource, the second identity associated with the second resource, the second identity associated with the second resource obtained by validating stack mapping information that identifies a mapping between a resource identifier of the second resource and a resource identifier of the first resource;
    obtaining, for the first resource, a second token for the first resource, the second token enabling the first resource to assert its second identity; and
    using, by the first resource, the second token to access one or more other resources, wherein the one or more other resources reside in the second tenancy of the plurality of tenancies provided by the CSPI.

13. The system of claim 12, wherein the first identity is obtained for the first resource from a control plane that is responsible for creating the first resource in the first tenancy of the CSPI.

14. The system of claim 12, wherein the first identity represents a resource principal identity associated with the first resource that enables the first resource to be authorized to access a plurality of cloud resources provided by the CSPI.

15. The system of claim 12, wherein the first token represents a resource principal session token associated with the first resource that represents a temporary session token and a secure credential associated with the first resource that enables the first resource to authenticate itself to a plurality of cloud resources provided by the CSPI.

16. The system of claim 12, wherein the stack mapping information is stored by a control plane that is responsible for creating the second resource in the second tenancy of the plurality of tenancies of the CSPI, and wherein the stack mapping information is implemented as a resource stack by the control plane.

17. The system of claim 16, wherein the stack mapping information stored by the control plane identifies a directional mapping between the resource identifier of the second resource and the resource identifier of the first resource.

18. A non-transitory computer-readable medium storing instructions executable by a computer system that, when executed by one or more processors of the computer system, cause the one or more processors to perform operations comprising:
    obtaining, for a first resource, a first identity associated with the first resource, the first resource provisioned in a first tenancy of a plurality of tenancies provided by a cloud service provider infrastructure (CSPI);
    obtaining, for the first resource, a first token for the first resource, the first token enabling the first resource to assert its first identity;
    executing, for the first resource, a set of instructions to obtain a second identity associated with second resource upon which the first resource is built, the second resource residing in a second tenancy of the plurality of tenancies provided by the CSPI;
    obtaining, for the first resource, the second identity associated with the second resource, the second identity associated with the second resource obtained by validating stack mapping information that identifies a mapping between a resource identifier of the second resource and a resource identifier of the first resource;
    obtaining, for the first resource, a second token for the first resource, the second token enabling the first resource to assert its second identity; and
    using, by the first resource, the second token to access one or more other resources, wherein the one or more other resources reside in the second tenancy of the plurality of tenancies provided by the CSPI.

19. The non-transitory computer-readable medium of claim 18, wherein the set of instructions comprises code that is executed by an application associated with the first resource that informs the first resource to call a control plane of the second resource to obtain the second identity of the second resource.

20. The non-transitory computer-readable medium of claim 18, wherein the stack mapping information is stored by a control plane that is responsible for creating the second resource in the second tenancy of the plurality of tenancies of the CSPI, and wherein the stack mapping information is implemented as a resource stack by the control plane.

* * * * *